(12) United States Patent
Lee et al.

(10) Patent No.: US 9,138,682 B2
(45) Date of Patent: Sep. 22, 2015

(54) CARBON DIOXIDE ABSORBENT FOR EXHAUST GAS, AND PREPARATION METHOD THEREOF

(75) Inventors: Joong-Beom Lee, Daejeon (KR); Chong-Kul Ryu, Daejeon (KR); Won-Sik Jeon, Daejeon (KR); Jeom-In Baek, Daejeon (KR); Tae-Hyeong Eom, Daejeon (KR)

(73) Assignee: KOREA ELECTRIC POWER CORPORATION, Seoul (KR)

( * ) Notice: Subject to any disclaimer, the term of this patent is extended or adjusted under 35 U.S.C. 154(b) by 556 days.

(21) Appl. No.: 13/505,151

(22) PCT Filed: Oct. 30, 2009

(86) PCT No.: PCT/KR2009/006370
§ 371 (c)(1),
(2), (4) Date: Jul. 16, 2012

(87) PCT Pub. No.: WO2011/052829
PCT Pub. Date: May 5, 2011

(65) Prior Publication Data
US 2012/0273720 A1    Nov. 1, 2012

(51) Int. Cl.
*B01D 53/62* (2006.01)
*B01J 20/04* (2006.01)
(Continued)

(52) U.S. Cl.
CPC .............. *B01D 53/62* (2013.01); *B01J 20/043* (2013.01); *B01J 20/08* (2013.01); *B01J 20/2803* (2013.01);
(Continued)

(58) Field of Classification Search
CPC . B01J 20/043; B01J 20/2803; B01J 20/28061
See application file for complete search history.

(56) References Cited

U.S. PATENT DOCUMENTS

| 5,248,489 A | 9/1993 | Kidd et al. |
| 6,908,497 B1 | 6/2005 | Sirwardane |

(Continued)

FOREIGN PATENT DOCUMENTS

| CA | 2 502 988 A1 | 5/2004 |
| CA | 2 617 925 A1 | 11/2007 |

(Continued)

OTHER PUBLICATIONS

Canadian Office Action (in English) issued in Canadian Patent Application No. CA 2,779,427 dated Aug. 8, 2013.

*Primary Examiner* — Joseph D Anthony
(74) *Attorney, Agent, or Firm* — McDermott Will & Emery LLP

(57) ABSTRACT

A $CO_2$ absorbent for exhaust gas capable of being repeatedly used in capturing and recycling of $CO_2$ is provided. The $CO_2$ absorbent for exhaust gas capturing $CO_2$ included in exhaust gas is composed of solid materials including an active component at 5 to 70 wt %, a support at 5 to 70 wt %, an inorganic binder at 5 to 70 wt % and a recycling improver at 5 to 70 wt %. The $CO_2$ absorbent for exhaust gas having such a composition meets the requirements for processes, including physical properties such as a spherical shape, an average particle size and size distribution, a tap density and attrition resistance, and has excellent $CO_2$ absorbing capability and recycling capability.

The carbon dioxide absorbent for exhaust gas satisfies physical characteristics such as spherical shape, average particle size and size distribution, tap density, attrition resistance and the like required for processes, and has excellent $CO_2$ absorption and recycling capabilities.

13 Claims, 4 Drawing Sheets

(51) Int. Cl.
*B01J 20/06* (2006.01)
*B01J 20/08* (2006.01)
*B01J 20/10* (2006.01)
*C04B 33/22* (2006.01)
*B01J 20/02* (2006.01)
*B01J 20/28* (2006.01)
*B01J 20/30* (2006.01)
*B01J 20/32* (2006.01)
*B01J 20/34* (2006.01)

(52) U.S. Cl.
CPC .......... *B01J 20/28061* (2013.01); *B01J 20/305* (2013.01); *B01J 20/3021* (2013.01); *B01J 20/3078* (2013.01); *B01J 20/3204* (2013.01); *B01J 20/3236* (2013.01); *B01J 20/3433* (2013.01); *B01J 20/3483* (2013.01); *B01D 2251/306* (2013.01); *B01D 2251/606* (2013.01); *B01D 2257/504* (2013.01); *Y02C 10/04* (2013.01); *Y02C 10/06* (2013.01); *Y02C 10/08* (2013.01)

(56) References Cited

U.S. PATENT DOCUMENTS

| | | | |
|---|---|---|---|
| 7,314,847 | B1 | 1/2008 | Siriwardane |
| 7,820,591 | B2* | 10/2010 | Ryu et al. ............... 502/400 |
| 8,110,523 | B2* | 2/2012 | Ryu et al. ............... 502/400 |
| 2004/0077492 | A1 | 4/2004 | Yaluris et al. |
| 2006/0148642 | A1* | 7/2006 | Ryu et al. ............... 502/84 |
| 2007/0072769 | A1 | 3/2007 | Imada et al. |
| 2008/0119356 | A1* | 5/2008 | Ryu et al. ............... 502/400 |
| 2008/0236389 | A1 | 10/2008 | Leedy et al. |
| 2014/0332720 | A1* | 11/2014 | Eom et al. ............... 252/190 |

FOREIGN PATENT DOCUMENTS

| | | |
|---|---|---|
| JP | 2006-187701 A | 7/2006 |
| JP | 2007-090208 A | 4/2007 |
| KR | 10-2005-0012600 A | 2/2005 |
| KR | 10-2006-0079588 A | 7/2006 |
| KR | 10-2006-0079589 A | 7/2006 |

* cited by examiner

FIG. 3

```
TRANSPORT SLURRY  — 21
        ↓
SPRAY SLURRY INTO SPRAY DRIER  — 22
```

FIG. 4

```
DRY PRIMARILY PREPARED ABSORBENT  — 30
        ↓
CALCINATE DRIED ABSORBENT  — 31
```

CARBON DIOXIDE ABSORBENT FOR EXHAUST GAS, AND PREPARATION METHOD THEREOF

RELATED APPLICATIONS

This application is the U.S. National Phase under 35 U.S.C. §371 of International Application No. PCT/KR2009/006370, filed on Oct. 30, 2009, the disclosure of which Application is incorporated by reference herein.

BACKGROUND

1. Field of the Invention

The present invention relates to a carbon dioxide ($CO_2$) absorbent for exhaust gas and a method of preparing the same, and more particularly, to a $CO_2$ absorbent for exhaust gas capable of being repeatedly used in capture of $CO_2$ and recycling and a method of preparing the same.

2. Discussion of Related Art

Carbon dioxide ($CO_2$) is one of the critical substances causing a greenhouse effect, and is known to have a potential to contribute to global warming since the emission of $CO_2$ increases according to a continuous increase in use of fossil fuels.

Therefore, if $CO_2$ emission is not controlled, problems caused by global warming cannot be overcome. Various methods of removing $CO_2$ from exhaust gas generated by combustion of fossil fuels include a variety of methods such as wet chemical absorption, adsorption, membrane separation, and cryogenic fractionation. However, these methods have problems of high capture cost or difficulty in application to electric power plants or large-scale industries.

An effective method of removing $CO_2$ from exhaust gas is dry $CO_2$ capture technology. This method is technology of using a solid instead of a liquid solvent used in wet chemical absorption as an absorbent. That is, in this technology, $CO_2$ contained in exhaust gas is captured by carbonate or bicarbonate generated by an active component and $CO_2$ in a solid absorbent in an absorption reactor through a chemical reaction, and the absorbent absorbing $CO_2$ can be repeatedly used by being recycled by additional heat in a recycling reactor.

In dry recycling/absorption technology, materials are inexpensive, regenerative and repeatedly used. In addition, the dry recycling/absorption technology is a sustainably growing field compared with other technologies in terms of design flexibility, environment-friendly capability, low-energy recycling, high-efficiency $CO_2$ absorption force (absorbing capability and reactivity), etc.

Conventional patents relating to such dry recyclable scrubbing technology include U.S. Pat. Nos. 7,314,847B1 and 6,908,497B1, Japanese Patent Application Publication No. 2007-090208A, and U.S. Patent Application Publication No. 20070072769A1.

The above-mentioned patents mainly relate to an absorbent prepared by adding an active component to a support or an active component itself, and thus are inappropriate to be applied to a process of capturing and sequestrating $CO_2$ while a particle of a solid absorbent is continuously transported between absorption and recycling reactors.

SUMMARY OF THE INVENTION

The present invention is directed to providing a $CO_2$ absorbent for exhaust gas which can effectively capture $CO_2$ in a exhaust gas temperature range before emission of $CO_2$ to the air, can be easily recycled by an additional heat source, can be repeatedly used while being transported continuously between absorption and recycling reactors, and thus can be reduced in capture cost of $CO_2$, and a method of preparing the same.

One aspect of the present invention provides a $CO_2$ absorbent for exhaust gas, which captures $CO_2$ included in exhaust gas and is composed of solid materials including an active component at 5 to 70 wt %, a support at 5 to 70 wt %, an inorganic binder at 5 to 70 wt %, and a recycling improver at 5 to 70 wt %.

Another aspect of the present invention provides a method of preparing a $CO_2$ absorbent for exhaust gas, including preparing a slurry using the solid materials, primarily preparing an absorbent by drying the prepared slurry using a spray drier, and preparing a final absorbent by dry calcinating the primarily prepared absorbent.

BRIEF DESCRIPTION OF THE DRAWINGS

The above and other objects, features and advantages of the present invention will become more apparent to those of ordinary skill in the art by describing in detail exemplary embodiments thereof with reference to the adhered drawings, in which:

FIG. 3 is a process diagram illustrating an operation of molding an absorbent by spray drying the prepared slurry;

FIG. 4 is a process diagram illustrating an operation of preparing a final absorbent by dry calcinating the molded absorbent;

DETAILED DESCRIPTION OF EXEMPLARY EMBODIMENTS

Figure 1:
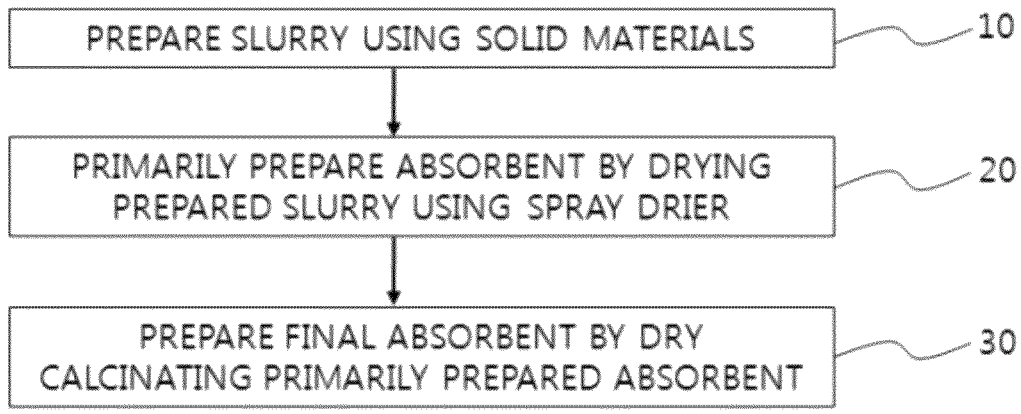
FIG. 1 is a process diagram illustrating an operation of preparing a $CO_2$ absorbent for exhaust gas according to the present invention.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Hereinafter, exemplary embodiments according to the present invention will be described in detail with reference to the accompanying drawings.

Solid materials composing a $CO_2$ absorbent for exhaust gas according to the present invention are composed of an active component, a support, an inorganic binder, and a recycling improver.

The active component is a substance which selectively reacts with $CO_2$ to effectively capture and sequestrate $CO_2$ from a gas stream. The substance includes carbonates or bicarbonates of alkali metals and alkali earth metals in Groups I and II of the periodic table, or components capable of being converted into such carbonates. The active component is contained at 5 to 70 wt % of the total solid materials, and preferably at 10 to 50 wt %. A purity of the active component may be 98% or more.

The support is a substance which has a large specific surface area, uniformly distributing the active component in the absorbent particle, enhancing utilization of the active component, and easily adsorbing or absorbing $CO_2$ or moisture required for the reaction. As such a substance, alumina, which has a large specific area, is used. The alumina is contained at 5 to 70 wt %, and preferably 5 to 50 wt % of the total solid materials. The alumina used herein has a content of $Al_2O_3$ at 99.8%, and a specific surface area at 150 or 250 $m^2/g$.

The inorganic binder is a substance giving mechanical strength to the absorbent by bonding the active component with the support. The inorganic binder includes a cement such as calcium silicate and calcium aluminate, a clay such as bentonite and kaolinite, and a ceramic such as alumina sol, silica sol and boehmite The inorganic binder is contained at 5 to 70 wt %, and preferably 10 to 50 wt % of the total solid materials.

The recycling improver is a substance facilitating recycling of the absorbent to repeatedly perform absorption and recycling reactions without a decrease in reactivity according to repetitive use of the absorbent. The recycling improver is titanium dioxide ($TiO_2$), zirconium dioxide ($ZrO_2$), and hydrotalcite composed of magnesium and alumina Such a recycling improver is contained at 5 to 70 wt %, and preferably at 5 to 50 wt % of the total solid materials.

In a process of preparing a $CO_2$ absorbent for exhausting gas according to the present invention, an additive is needed to give calcinating capability and dispersibility during mixing of the solid materials in water, which is a solvent. That is, in preparation of a slurry, a stable and freely flowing slurry in which the solid materials are well dispersed is prepared, and an additive is needed to maintain the shape of particles molded by spray drying. An organic additive added herein includes a dispersing agent, a defoaming agent, and an organic binder. In addition, a pH controller is added to control a pH concentration of the slurry.

The dispersing agent is used to prevent agglomeration of particles during comminution. That is, when particles of the solid materials are comminuted into powdery fine particles during the comminution to control a particle size of the solid materials composing the absorbent, the particles may agglomerate, resulting in reduction in a comminuting efficiency. Therefore, it is essential to use a dispersing agent.

The dispersing agent includes an anionic dispersing agent, a cationic dispersing agent, an amphoteric dispersing agent, a non-ionic dispersing agent or a composite thereof. The anionic dispersing agent includes polycarboxylic acid, polycarboxylic acid amine, polycarboxylic acid amine salt, and polycarboxylic acid sodium salt. Such an anionic dispersing agent is contained at 0.1 to 10 wt % of the total solid materials. The non-ionic dispersing agent is a fluorosurfactant, which is contained at 0.01 to 0.3 wt % based on the total solid materials.

The defoaming agent is used to remove bubbles from a slurry to which the dispersing agent and inorganic binder are applied, and includes metal soap- and polyester-based non-ionic surfactants. Such a defoaming agent is contained at 0.01 to 0.2 wt % based on the total solid materials.

The organic binder is added in the preparation of the slurry in order to give calcinating capability and flowability to a slurry, maintain a shape of the solid absorbent particle molded by spray drying, and eventually facilitate handling of the particle before drying and calcination. Such an organic binder includes polyvinylalcohol-based binders, polyglycol-based binders, methylcellulose and a composite thereof. The organic binder is contained at 0.5 to 5 wt % based on the total solid materials.

Hereinafter, an operation of preparing a $CO_2$ absorbent for exhaust gas according to the present invention will be described in detail.

FIG. 1 is a process diagram illustrating an operation of preparing a $CO_2$ absorbent for exhaust gas according to the present invention.

A method of preparing a $CO_2$ absorbent for exhaust gas according to the present invention includes preparing a slurry by mixing solid materials in water and comminuting and dispersing the resulting mixture (S10), primarily molding an absorbent by spray drying the prepared slurry (S20), and preparing a final absorbent by dry calcinating particles of the molded solvent (S30).

The absorbent prepared as described above absorbs $CO_2$ in a exhaust gas temperature range (50 to 100° C.) by an absorption reactor, and is recycled by an additional heat source at 100 to 200° C. by a recycling reactor and thus repeatedly used.

Figure 2:
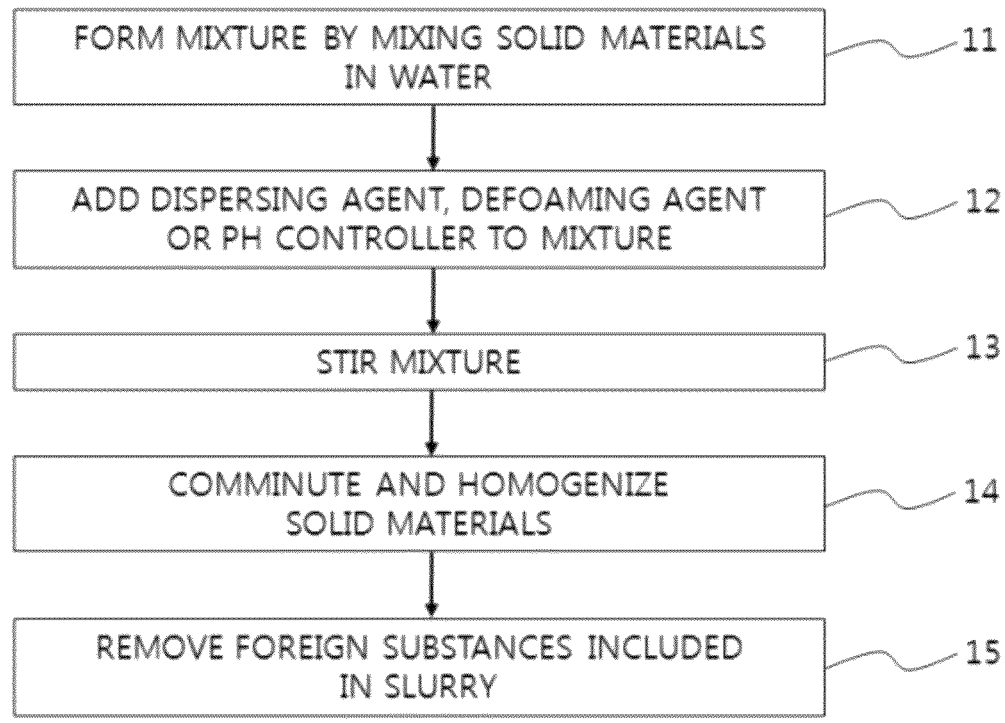
FIG. 2 is a process diagram specifically illustrating an operation of preparing a slurry.

FIG. 2 is a process diagram specifically illustrating an operation of preparing a slurry.

Each material is precisely measured according to a composition of the slurry, and distilled water corresponding to the concentration of the slurry to be prepared (a weight ratio of water based on the solid materials) is put into a suitable container (S11). Here, a dispersing agent and a defoaming agent may be added.

Subsequently, an active component such as calcium carbonate is first completely dissolved, and then mixed with a support, an inorganic binder and a recycling improver (S12). In this operation, to give flowability to the slurry in which the solid materials are mixed and facilitate mixing of the materials, a dispersing agent or defoaming agent may be added. In addition, to prevent use of an excessive dispersing agent, the concentration of the slurry may be controlled with water, and the concentration of the mixed slurry may be 20 to 50 wt %.

The materials are stirred using a stirrer during and after addition of the materials to be uniformly mixed (S13). There is no specific limitation to a stirrer, but a mechanical stirrer, a homogenizer, an ultrasonic homogenizer, a high shear blender or a double-helix mixer may be generally used. A stirrer may be selectively used according to an amount of the materials to be input.

The particles of the solid materials included in the mixed slurry are comminuted down to less than 1 μm in size, and when necessary, additional dispersing agent, defoaming agent, and pH controller may be used to uniformly disperse the uncomminuted particles resulting in a preparation of a stable slurry.

After the materials input as described above are mixed, the solid materials are subjected to fine comminution and homogenization using a comminutor (S14). Here, a wet milling method is used to raise a comminution effect and prevent flying of particles occurring in dry comminution.

A comminutor used to comminute the solid materials includes a roller mill, a ball mill, an attrition mill, a planetary mill, and a bead mill. When the comminution and homogenization are performed using a high energy bead mill among the above-mentioned comminutors, a fill amount of beads, which are a comminutor medium, may be 60 to 80% based on a volume of a comminution container. The beads, which are the comminution medium, use yttrium-stabilized zirconia beads having excellent mechanical strength and stability. A size of the beads may be in a range of 0.3 to 1.25 mm.

The size of the comminuted particles of the solid materials included in the slurry is controlled to be less than 1 μm, and comminution or homogenization is performed twice to prepare a uniform slurry. During the comminution, a dispersing agent and a defoaming agent may be added to control fluidity of the slurry, thereby allowing transport of the slurry through a pump.

Meanwhile, before final comminution, the slurry is uniformly mixed by adding an organic binder.

For the slurry subjected to the comminution and homogenization, characteristics of the slurry such as a concentration, viscosity, etc. are adjusted using a dispersing agent, a defoaming agent, or additional water, and foreign substances (dirt, dried slurry chunks or impurities) included in the slurry are removed through vacuum sieving (S15).

FIG. 3 is a process diagram illustrating an operation of molding an absorbent by spray drying the prepared slurry.

The foreign substances removed from the slurry are transferred to a container for spray drying (S21), and then sprayed into a spray drier through a pump (S22). There is no limitation to the viscosity of the slurry capable of being transferred to the pump, but the slurry may be sprayed at a viscosity of 300 cP or more.

In the spray drier, the freely flowing slurry is molded into spherical particles of a solid absorbent. An operating condition for the spray drier includes a particle distribution of an absorbent of 30 to 400 μm.

Factors influencing the shape of the absorbent particle, the size and distribution of the particle, and a structure of the absorbent include a concentration and a viscosity of the slurry, a degree of distribution, a pressure and an amount of the injected slurry, a drying content and a temperature of the spray drier. These parameters vary according to the structure and spray type of the spray drier.

There is no limitation to the spray drier, but the spray drier may be manufactured to be operated in a counter-current type using a centrifugal pressure nozzle. That is, for an average particle of the absorbent to be 60 to 180 μm, the spray drier may use a counter-current fountain configuration-type spray method in which a centrifugal pressure nozzle is installed under the drier so as to increase a stay time of particles sprayed into the drier.

Operating conditions for an exemplary spray drier include an injection pressure at 5 to 15 kg/cm$^2$, an inner diameter of a centrifugal pressure nozzle at 0.5 to 1.2 mm, an inlet temperature of the drier at 260 to 300° C., and an outlet temperature of the drier of 110 to 130° C.

FIG. 4 is a process diagram illustrating an operation of preparing a final absorbent by drying and calcinating the molded absorbent.

The absorbent molded in a spherical shape in the spray drier is dried for more than 2 hours in a reflux drier in an atmosphere at 110 to 150° C. (S31). The dried absorbent is increased in temperature at a speed of 2 to 5° C./min, and then maintained for more than 2 hours at a final calcination temperature ranging from 350 to 1000° C. (S32).

The finally prepared absorbent meets conditions required for the process, including a spherical shape, a particle size of 60 to 180 μm, a particle distribution of 30 to 400 μm, a tap density of 0.6 g/cc or more, a $CO_2$ absorbing capability of 3 wt % or more, a recycling capability of 70% or more, and an attrition resistance of 30% or less.

Hereinafter, various characteristics according to the present invention will be described in detail with reference to Examples.

Example 1

In the present Example, an absorbent was prepared of solid materials in a composition including potassium carbonate ($K_2CO_3$) or potassium bicarbonate ($KHCO_3$) as active components at 20 to 50 wt %, gamma alumina ($\gamma$-$Al_2O_3$) as a support at 20 to 50 wt %, calcium silicate, bentonite and pseudo-boehmite as inorganic binders at 15 to 20 wt %, and titanium dioxide ($TiO_2$), zirconium dioxide ($ZrO_2$) and hydrotalcite as recycling improvers at 5 to 20 wt % of a total of 8 kg of the solid materials.

A mixed slurry was prepared by sequentially adding the materials in water while stirring to have a concentration of the solid materials included in the slurry of 25 to 40 wt %. Here, a dispersing agent was input to easily mix and disperse the materials before the materials were input, or a small amount of a dispersing agent was input according to a viscosity of the mixed slurry and a degree of stirring during sequential input of the materials. A small amount of a defoaming agent was input according to an amount of foam created after the dispersing agent was input or during stirring of the slurry.

The mixed slurry was sufficiently stirred at a speed of 10,000 to 25,000 rpm for more than 10 minutes using a double-helix stirrer to prevent precipitation of particles having a relatively great specific gravity or a relatively large size among the solid materials.

The mixed slurry was prepared by comminuting and homogenizing the particles of the solid materials twice or more using a high energy bead mill. Here, to control properties of the slurry such as the viscosity of the slurry, the concentration of the solid materials and pH or facilitate ease of work, water, a dispersing agent, a defoaming agent or an organic amine for pH control were further added. As an organic binder, polyethylglycol (PEG) was added to and uniformly dispersed in the slurry at 1 to 3 wt % of the total solid materials before final comminution.

A final slurry obtained through the control of the properties of the slurry was subjected to vacuum sieving to remove foreign substances which may have been input in the preparation of the slurry.

The slurry from which the foreign substances were removed was adjusted to have a concentration of 27 to 38 wt % and subjected to spray drying.

Particles of the absorbent molded as described above were dried in a drier in an atmosphere at 120° C. for 2 hours or more, heated in a furnace to a final calcination temperature of 500 to 650° C. at a speed of 2 to 5° C./min, and then maintained at the final temperature for 2 hours or more, thereby preparing a final absorbent.

To efficiently remove the organic additive and the organic binder added in the preparation of the slurry, the particles were maintained at 200, 400 and 500° C. for 1 hour each before the particles reached the final calcination temperature. The absorbents prepared as described above are represented as A, B, C, D, E, F, G and H according to compositions of the active component, the support, the binder and the recycling improver.

Table 1 shows the compositions and preparation characteristics of the absorbents including a recycling improver.

Table 2 summarizes physical properties and reaction characteristics of absorbents A to H prepared as described above.

A particle shape was observed with the naked eye, or using an industrial microscope or a scanning electron microscope (SEM), and an average particle size and a size distribution of an absorbent were measured according to the standard sieving method, ASTM E-11. Here, 10 g of an absorbent sample was subjected to sieving in a sieve shaker for 30 minutes, and then the average particle size and size distribution were calculated according to the following method.

A tap density of an absorbent was measured using an apparatus and a method presented by the standard specification, ASTM D 4164-88.

A specific surface area and a pore volume of an absorbent were measured using a quantachrome multi BET surface area meter and an Hg porosity meter, respectively.

Attrition resistance of an absorbent molded by spray drying was measured using a 3-hole attrition tester manufactured corresponding to ASTM D5757-95 according to a test method and a sequence presented by the specification.

An attrition index (AI) calculated by the method presented by ASTM refers to a ratio of an amount of fine powder captured after being attrited in an attrition tube at a flow rate

TABLE 1

| Solid Absorbents | Absorbent A | Absorbent B | Absorbent C | Absorbent D | Absorbent E | Absorbent F | Absorbent G | Absorbent H |
|---|---|---|---|---|---|---|---|---|
| Active Component ($K_2CO_3$) wt % | 35 | 35 | 35 | 35 | 40 | 40 | — | — |
| Active Component ($KHCO_3$) wt % | — | — | — | — | — | — | 35 | 35 |
| Support (γ-Alumina, VGL-15) wt % | 43 | 33 | 43 | 43 | 33 | — | 43 | 43 |
| Support (γ-Alumina, VGL-25) wt % | — | — | — | — | — | 23 | — | — |
| Inorganic Binder (Calcium silicate) wt % | 7 | 7 | 5 | 7 | 7 | 7 | 7 | 7 |
| Inorganic Binder (Bentonite) wt % | 5 | 5 | 5 | 5 | 5 | 5 | 5 | 5 |
| Inorganic Binder (Pseudo-boehmite) wt % | 5 | 5 | 5 | 5 | 5 | 5 | 5 | 5 |
| Recycling improver ($TiO_2$) wt % | 5 | 10 | 7 | — | 10 | 20 | 5 | — |
| Recycling improver ($ZrO_2$) wt % | — | — | — | 5 | — | — | — | 5 |
| Recycling improver (Hydrotalcite) wt % | — | 5 | — | — | — | — | — | — |
| Total Solid Materials wt % | 100 | 100 | 100 | 100 | 100 | 100 | 100 | 100 |
| Non-ionic Dispersing Agent wt % | | | | 0.01~0.1 | | | | |
| Anionic Dispersing Agent wt % | | | | 0.1~3 | | | | |
| Defoaming Agent wt % | | | | 0.01~0.1 | | | | |
| Organic Binder wt % | | | | 1.0~5.0 | | | | |
| Concentration of Slurry wt % | 32.5 | 30.1 | 37.49 | 33.97 | 31.82 | 30.7 | 27.49 | 30.92 |
| pH of Slurry | 11.9 | 11.4 | 11.09 | 10.78 | 10.98 | 10.86 | 8.83 | 8.75 |
| pH Controller (Organic Amine) wt % | — | — | 0.13 | 0.13 | — | — | 0.13 | 0.13 |
| Viscosity, cP | 6,500 | 36,500 | 1,853 | 1,710 | 2,800 | 1,180 | 1,430 | 1,790 | of 10 standard liters per minute (slpm) for 5 hours based on an initial amount of a sample (50 g). The AI is one of the important indexes among requirements of a (fluidized bed or high speed fluidized bed) process, the process preferring to AI at less than 30%.

Reaction characteristics, that is, absorption and recycling, of absorbents A to H prepared in the present Example were measured by thermogravimetric analysis. A weight and a total flow rate of a sample used herein were 10 mg and 60 ml/min, respectively. The $CO_2$ absorption was measured at 70° C., and the recycling was performed at 140° C. A reaction gas was a gas similar to exhaust gas used in a coal thermoelectric power plant, and had a composition including $CO_2$ at 14.4%, oxygen at 5.4%, water as a vapor at 10%, and nitrogen at 70.2% on a volume percentage basis. As a recycling gas, nitrogen was used. The absorption and recycling of the absorbent were performed in at least 1.5 cycles (absorption-recycling-absorption) to evaluate first and second $CO_2$ absorbing capabilities of the absorbent, and the recycling capability of the absorbent was shown in a ratio of the second absorbing capability to the first absorbing capability on a percentage basis.

It was shown that attrition strength was increased as the AI also expressed as the attrition resistance decreased. Here, utilization refers to an index for utilization of active components included in each absorbent, converted into a percentage of measured $CO_2$ absorbing capability based on theoretical $CO_2$ absorbing capability of the absorbent.

Figure 5:
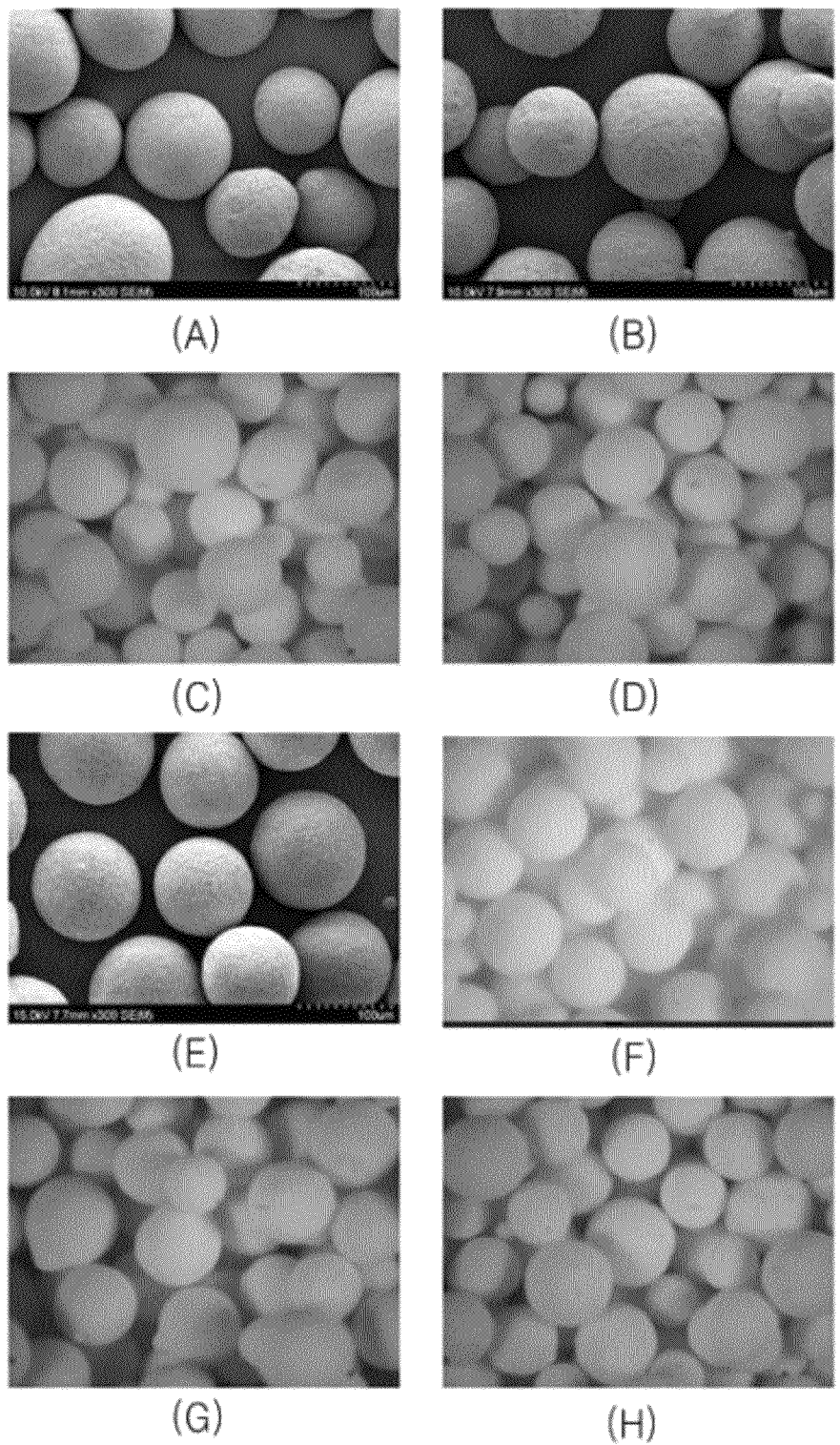
FIG. 5 is a photograph showing an absorbent presented in Example of the present invention, which is spherical.

FIG. 5 is a photograph showing that the solid absorbent presented by the present Example has a spherical shape.

30 to 400 μm, a tap density of 0.6 g/cc or more, $CO_2$ absorbing capability of 3 wt % or more, recycling capability of 70% or more, and attrition resistance of 30% or less, and has excellent $CO_2$ absorbing capability and recycling capability.

The solid absorbent according to Example of the present invention can capture $CO_2$ in a large-scale emitting source, for example, in an electric power plant, the steel industry or the oil refining industry at a low cost because of high mass-productivity and low production cost. In addition, since a process using the solid absorbent can be operated in a exhaust gas temperature range, for example, 200° C. or less, and does not need an additional heat source, the present invention can simultaneously solve two problems of cost reduction and efficient use of energy.

According to a $CO_2$ absorbent for exhaust gas and a method of preparing the same of the present invention, the absorbent meets requirements for a process, including physical properties such as a spherical shape, an average particle size and size distribution, a tap density and attrition resistance, and has excellent $CO_2$ absorbing capability and recycling capability. In addition, the absorbent can capture $CO_2$ in a large-scale emitting source, for example, in an electric power plant, the steel industry or the oil refining industry, at a low cost because of high mass-productivity and low production cost. Moreover, absorption (at 50 to 110° C.) and recycling (at 100 to 200° C.) are performed in an exhaust gas temperature range, and thus there is no need for an additional heat source. As a result, the present invention can simultaneously solve two problems of cost reduction and efficient use of energy.

TABLE 2

Physical Properties and $CO_2$ Reaction Characteristics of Each Absorbent

| Absorbents | | A | B | C | D | E | F | G | H |
|---|---|---|---|---|---|---|---|---|---|
| Shape[a] | | ss | ss | ss | Ss | ss | ss | ss | ss |
| APS[b], μm | | 104 | 95 | 134 | 121 | 106 | 118 | 132 | 150 |
| SD[c], μm | | 42-355 | 37-355 | 38-196 | 49-355 | 37-303 | 37-355 | 56-355 | 68-355 |
| Bulk density, g/ml | | 0.98 | 1.0 | 0.87 | 0.87 | 1.05 | 1.12 | 0.67 | 0.66 |
| BET[d], m$^2$/g | | 39 | 44 | 44 | 47 | 31 | — | 64 | 32 |
| Hg porosity, % | | 63 | 45 | 66 | 53 | 54 | — | 74 | 65 |
| AI[e], % | | 0.5 | 0.2 | 0.1 | 0.4 | 0.4 | 0.04 | 12 | 8.94 |
| TGA $CO_2$ Absorbing | 1st | 6.14 | 5.66 | 6.95 | 8.93 | 6.74 | 8.04 | 5.84 | 3.97 |
| Capability, wt % | 2st | 4.61 | 4.95 | 5.89 | 7.04 | 5.43 | 5.60 | 4.09 | 3.98 |
| Recycling Capability, % | | 75 | 88 | 85 | 79 | 81 | 70 | 70 | 100 |
| Final Calcination Temperature, ° C. | | 550 | 500 | 500 | 500 | 500 | 500 | 550 | 550 |

Figure 6:
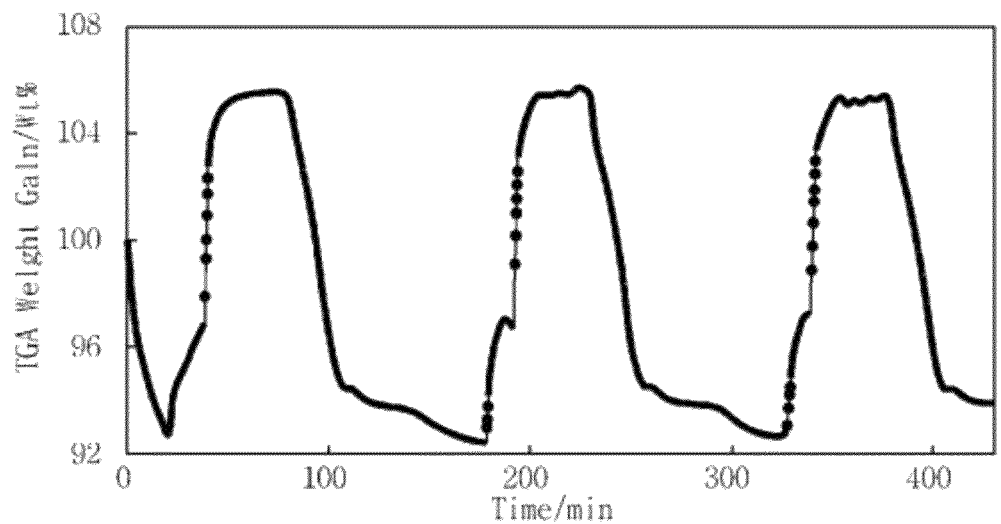
FIG. 6 is a graph of the absorption result for absorbent A presented in Example of the present invention.
Figure 7:
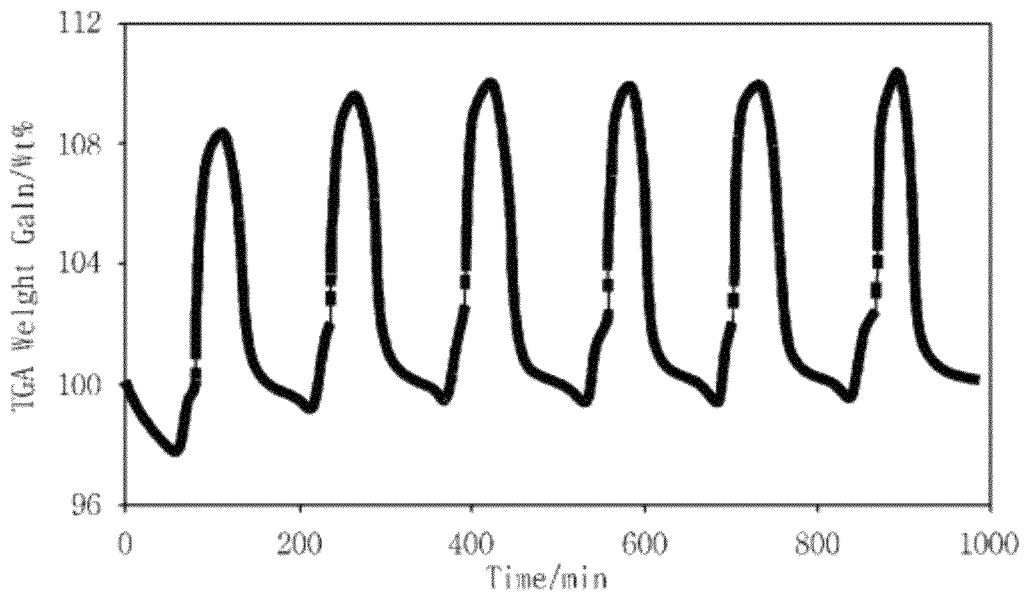
FIG. 7 is a graph of the recycling result for absorbent F presented in Example of the present invention.

Solid absorbents A and F molded by spray drying in the present Example were calcinated at 550° C. Afterward, absorbent A was subjected to two cycles of an absorption and recycling test, and absorbent F was subjected to 6 cycles of an absorption and recycling test to evaluate $CO_2$ absorbing capability and recycling capability. Results of the absorption and recycling for absorbents A and F are shown in FIGS. 6 and 7, respectively. As shown in FIGS. 6 and 7, absorbents A and F have no significant changes in weight gain according to the $CO_2$ absorbing capability and weight loss according to the recycling even after the $CO_2$ absorption and recycling were repeatedly performed.

As shown in the present Example, according to the present invention, a dry $CO_2$ capture process may directly use a solid absorbent including a recycling improver through spray drying.

Particularly, it can be noted that the solid absorbent according to Example of the present invention meets all physical properties required in the process, for example, a spherical shape, a particle size of 60 to 180 μm, a particle distribution of While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of preparing a $CO_2$ absorbent for exhaust gas, comprising:
   preparing a slurry using solid materials comprising an active component at 5 to 70 wt %, a support at 5 to 70 wt %, an inorganic binder at 5 to 70 wt % and a recycling improver at 5 to 70 wt %, based on the total weight of the slurry;
   primarily preparing an absorbent by drying the prepared slurry in a spray drier; and
   preparing a final absorbent by drying and calcinating the primarily prepared absorbent,
   wherein the active component is potassium carbonate or potassium bicarbonate, wherein the support is alumina,
wherein the inorganic binder is cement, clay, or ceramic,
wherein the recycling improver is hydrotalcite, and
wherein the absorbent material molded in the preparation of the final absorbent has a recycling capability of 70 to 100%.

2. The method of claim 1, wherein preparing the slurry comprises:
forming a mixture by mixing the solid materials in water;
adding a dispersing agent, a defoaming agent, an organic binder or a pH controller to the mixture;
stirring the mixture; and
comminuting and homogenizing the solid materials.

3. The method of claim 2, wherein the slurry has a concentration (a weight ratio of water to the solid materials) of 20 to 50 wt %.

4. The method of claim 2, wherein the solid materials are stirred at a speed of 10,000 to 25,000 rpm using a stirrer including a general stirrer, a double-helix stirrer, a high speed emulsifier, a high shear blender or an ultrasonic emulsifier.

5. The method of claim 2, wherein the solid materials are comminuted using a comminutor including a roller mill, a ball mill, an attrition mill, a planetary mill or a bead mill, and the solid materials are comminuted to a size of larger than 0 to 1 μm or less.

6. The method of claim 2, wherein the dispersing agent is an anionic dispersing agent, a cationic dispersing agent, an amphoteric dispersing agent, a non-ionic dispersing agent or a composite thereof, and is added at 0.1 to 10 wt % based on the total weight of the solid materials.

7. The method of claim 2, wherein the defoaming agent is a metal soap- or polyester-based material, and added at 0.01 to 0.2 wt % based on the total weight of the solid materials.

8. The method of claim 2, wherein the organic binder is a polyvinylalcohol- or polyglycol-based material, methylcellulose or a composite thereof, and added at 0.5 to 5 wt % of the total weight of the solid materials.

9. The method of claim 1, wherein preparing the slurry comprises the removal of foreign substances included in the slurry.

10. The method of claim 9, wherein the foreign substances are removed through vacuum sieving.

11. The method of claim 1, wherein, during the primary preparation of the absorbent, an injection pressure of the spray drier is 5 to 15 kg/cm$^2$, an inner diameter of a centrifugal pressure nozzle is 0.5 to 1.2 mm, an inlet temperature of the drier is 260 to 300° C., and an outlet temperature of the drier is 110 to 130° C.

12. The method of claim 1, wherein preparing the final absorbent comprises drying the primarily prepared absorbent in a reflux drier in an atmosphere at 110 to 150° C., and heating the dried absorbent in an atmosphere at a speed of 2 to 5° C./min to calcinate the absorbent at a temperature of 350 to 1000° C.

13. The method of claim 12, wherein the absorbent molded in the preparation of the final absorbent has a spherical shape, a particle size of 60 to 180 μm, a particle distribution of 30 to 400 μm, a tap density of 0.6 to 1.2 g/cc, an attrition resistance of 0.01 to 30%, and a $CO_2$ absorbing capability of 3 to 10 wt %.

* * * * *